Sept. 11, 1951  G. W. KEAN  2,567,605
COLLET CHUCK
Filed Aug. 4, 1949
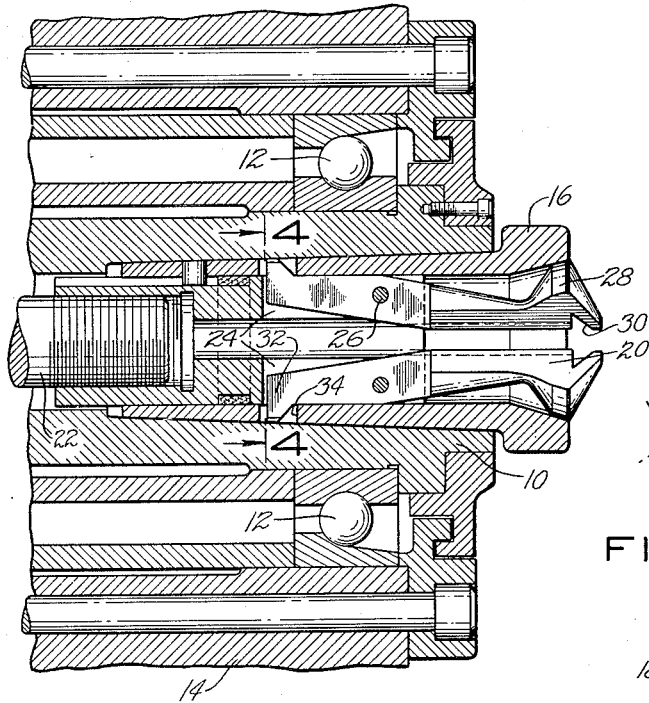
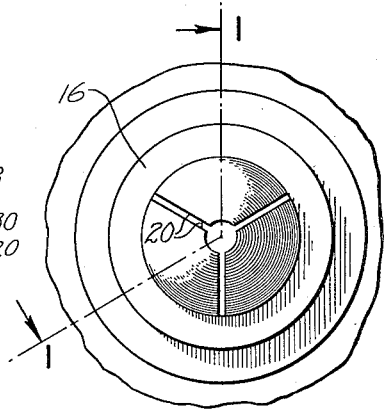
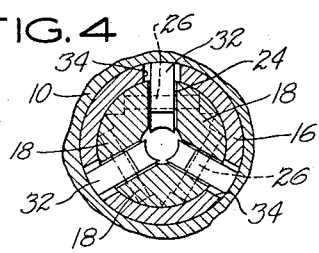
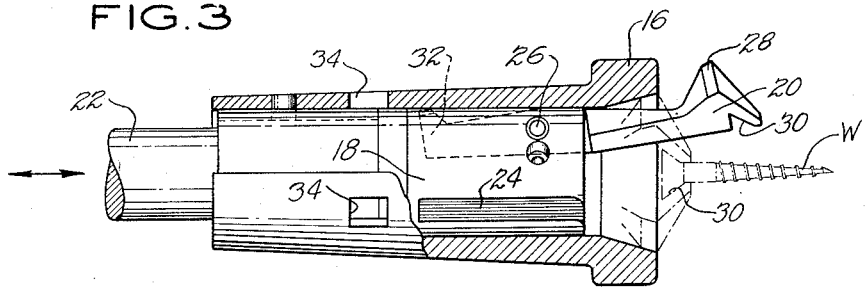
INVENTOR
GEORGE W. KEAN
BY *Joseph H. Schofield*
ATTORNEY Patented Sept. 11, 1951

2,567,605

UNITED STATES PATENT OFFICE 2,567,605

COLLET CHUCK

George W. Kean, Hartford, Conn.

Application August 4, 1949, Serial No. 108,530

3 Claims. (Cl. 279—37)

This invention relates to work holding chucks and particularly to a chuck of the collet type for securely holding a work piece such as a wood screw coaxially with a rotatable spindle during a cutting operation.

More particularly the invention relates to a collet chuck for holding a wood screw or other work piece to be threaded at the end of a spindle by work engaging members engaging over the head of the screw and in contact with the screw shank closely adjacent the head during the threading or other operation.

A primary object of the invention is to provide a chuck having its work engaging members pivotally mounted within the chuck body, these members being positively moved to their open and closed positions by axial movement of the body member relative to the chuck sleeve.

A feature that enables the above object to be accomplished is that the work engaging members are pivotally mounted within the axially movable body member and at their rear ends are each provided with an outwardly extending projection movable into individual recesses in the chuck sleeve when the work engaging members are moved to their work clamping or closed positions.

Another object of the invention is to improve the construction and operation of collet chucks by the pivotal mounting of the work engaging members and the conical surfaces at the outer end of these members to give a powerful clamping action to these members and a positive and wide opening movement to permit the insertion and extraction of work pieces such as wood screws having large heads.

With the above and other objects in view the invention may include the features of construction and operation set forth in the following specification and illustrated in the accompanying drawing.

In the accompanying drawing annexed hereto and forming a part of this specification, I have shown the invention embodied in a collet chuck for a threading machine for wood screws but it will be understood that the invention can be otherwise embodied and that the drawing is not to be construed as defining or limiting the scope of the invention, the claims appended to this specification being relied upon for that purpose.

In the drawing:

Fig. 1 is a vertical longitudinal section taken through the axis of a rotatable spindle to which the collet chuck forming the present invention has been applied;

Fig. 2 is an end elevation of the chuck and a portion of the spindle shown in Fig. 1;

Fig. 3 is a longitudinal sectional view of the chuck showing the work engaging members in open and closed position; and Fig. 4 is a transverse sectional view of the chuck taken on the plane of line 4—4 in Fig. 1.

In the above mentioned drawing, there has been shown but one embodiment of the invention which is now deemed preferable, but it is to be understood that changes and modifications may be made within the scope of the appended claims without departing from the spirit of the invention.

Briefly, and in its preferred aspect, the invention may include the following principal parts: First, a chuck sleeve adapted to fit within the end of a rotatably mounted work spindle and having a cylindrical opening extending substantially therethrough and having a conical surface at its outer end; second, a body member slidably mounted within the cylindrical opening; third, means to force said slidable member in either direction; fourth, angularly disposed work engaging members pivotally mounted at an intermediate point along their length to said slidable member; fifth, surfaces on said work engaging members engaging the conical surface on the forward end of said sleeve member to force said work engaging members in clamping position when said slidable member is moved in one direction; and sixth, projections at the rear of said work engaging members engaging within openings in said sleeve member to force said work engaging members into their open positions when said slidable member is moved in the opposite direction.

Referring more in particular to the figures of the drawing it will be seen that the work supporting spindle 10 is mounted for rotation on one or more anti-friction bearings 12 within a machine head stock 14 of the usual type. The forward end of the spindle 10, which is hollow throughout its length, is provided with a conical or outwardly tapered open end into which is fitted a chuck body or sleeve member 16. The sleeve member 16 is provided with an axially extending central cylindrical opening extending from end to end, the forward end of which is flared as shown with a short tapered surface. Slidable axially within the sleeve member 16 is a slidably mounted member 18 for supporting the work engaging members 20. This slidable or mounting member 18 for members 20 at its rear end is provided with internal screw threads engaging the threaded end of a rod 22 extending through the spindle 14 and by which the slidable member 18 may be moved from one operative position to the other by any convenient means. The means for operating the rod 22 form no part of the present invention and will not require description.

The slidable member 18 is provided with three equally angularly spaced longitudinally extending slots 24. Pivotally and individually mounted for movement within these slots are the work engaging members 20. At an intermediate point of each of the work engaging members 20 is a transverse pin 26 extending through the work engaging member 20 and through the slidable member 18. It is about the axes of these pins that the members 20 may oscillate.

At the forward end of the work engaging members 20 their outside portions are formed as shown with a conical surface 28 adapted to contact against the outwardly extending conical surface on the sleeve member 16 when the members 20 are moved to their clamping positions. The inner surfaces 30 of the work engaging members 20 at their forward ends are shaped to fit the particular work piece W to be clamped in position for its cutting operation. As shown in Fig. 3 the work engaging members 20 are shaped to engage over the head of a wood screw and also engage a short section of the shank closely adjacent the head.

At the rear ends of the work engaging members 20 are lateral projections 32 which bear against the inner surface of the sleeve member 16 during the forward movement of the slidable member 18 and opening movement of the members 20. This engagement serves to positively open the members 20. When the member 18 is moved rearwardly to effect the closing or clamping movement of the members 20 the projections 32 enter openings 34 provided in the sleeve member 16. The clamping action of the members 20 against the work piece is effected by the conical surfaces 28 on the members 20 engaging against the outwardly flared surface of the sleeve member directly aligned with or in the same radial plane with the work engaging surfaces 30.

From the above description the operation of the chuck to clamp and unclamp work pieces within the outer or free ends of the members 20 will be understood. By advancing the rod 22 far enough in a forward direction the members 20 will be widely enough separated radially that a work piece such as a large headed screw can be inserted.

I claim:

1. A collet chuck comprising in combination, a sleeve member, a slidable member therein, work engaging members pivotally mounted within said slidable member, inter-engaging conical surfaces on said work engaging members and sleeve at the work engaging ends of said members and sleeve for closing said work engaging members when said slidable member is moved in one direction, and lateral projections formed at the rear ends of said work engaging members, said projections entering recesses formed in said sleeve member when said slidable member is moved to its work clamping position.

2. A collet chuck comprising in combination, a sleeve having a conical recess at its outer end, a slidable member therein, work engaging members pivotally mounted within said slidable member, means to effect a work clamping movement of said work engaging members when said slidable member is moved in one direction, to draw the outer ends of said work engaging members into said recess, and projections formed on the rear ends of said work engaging members, said projections engaging the inner wall of said sleeve when said slidable member is moved in the opposite direction to effect opening movement of said work engaging members.

3. A collet chuck comprising in combination, a sleeve, a slidable member therein, work engaging members pivotally mounted intermediate their length within said slidable member, means to effect a work clamping movement of said work engaging members when said slidable member is moved in one direction, to draw the outer ends of said work engaging members into said recess, projections on the rear ends of said work engaging members, and said sleeve having openings into which said projections on work engaging members extend when said slidable member is moved in a direction to effect a closing movement of said work engaging members, movement of said slidable member in the opposite direction serving to withdraw said projections from said openings to positively move said work engaging members to their open position.

GEORGE W. KEAN.

REFERENCES CITED

The following references are of record in the file of this patent:

UNITED STATES PATENTS

| Number | Name | Date |
| --- | --- | --- |
| 307,252 | Armstrong | Oct. 28, 1884 |
| 820,073 | Spanogle | May 8, 1906 |
| 1,575,149 | Craig et al. | Mar. 2, 1926 |
| 1,990,525 | Chancellor | Feb. 12, 1935 |
| 2,381,657 | Eksergian et al. | Aug. 7, 1945 |